UNITED STATES PATENT OFFICE.

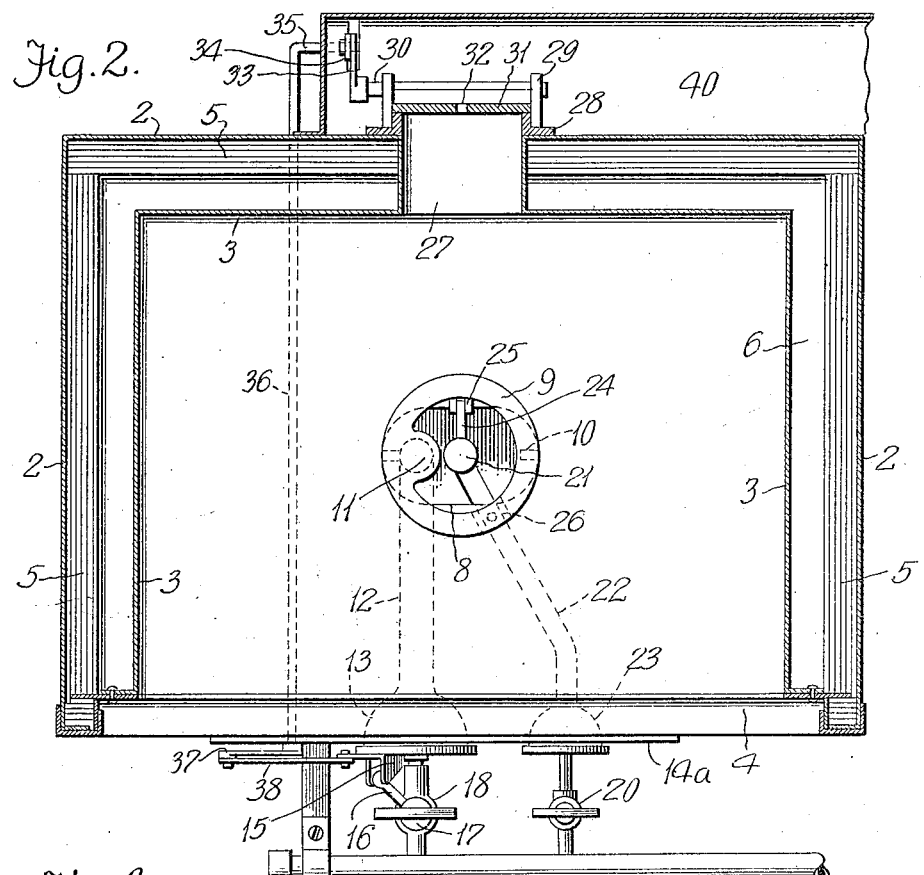
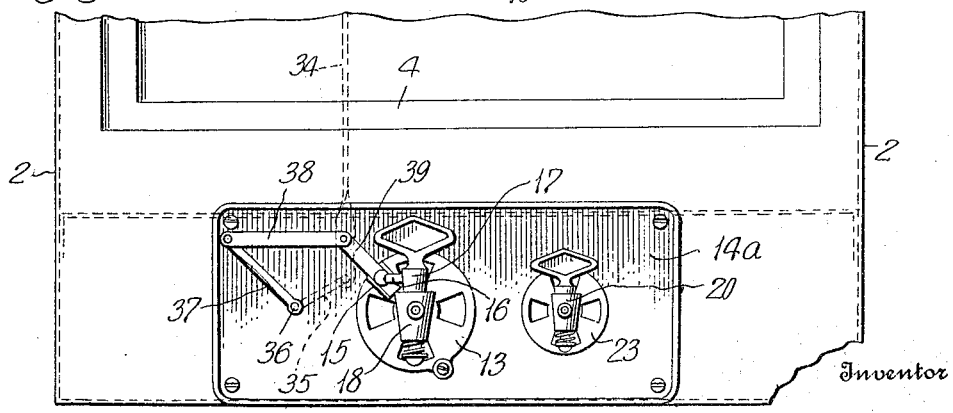

HENRY C. MAUL, OF DETROIT, MICHIGAN, ASSIGNOR TO THE MICHIGAN STOVE COMPANY, OF DETROIT, MICHIGAN, A CORPORATION OF MICHIGAN.

OVEN.

1,262,822.  Specification of Letters Patent.  Patented Apr. 16, 1918.

Application filed March 19, 1917. Serial No. 155,759.

*To all whom it may concern:*

Be it known that I, HENRY C. MAUL, a citizen of the United States of America, residing at Detroit, in the county of Wayne and State of Michigan, have invented certain new and useful Improvements in Ovens, of which the following is a specification, reference being had therein to the accompanying drawings.

This invention includes features disclosed by a pending application in the name of William J. Keep for an oven structure, filed July 3, 1916, Serial No. 107,270, and certain features of Patent No. 1,144,501, granted June 29, 1915, to Cephres R. Pomaville, the application and patent being owned and controlled by the Michigan Stove Company of Detroit, Michigan.

The present invention relates to oven structures which are heated from within by placing the heater in the oven or by conducting hot air or products of combustion from the heater into the oven, and utilize the novel insulated oven and door therefor disclosed by the above mentioned application. Such an oven is used for the reason that loss of heat by radiation and conduction is reduced to a minimum and a structure or compartment obtained similar to what is commonly known as a "fireless cooker". Some fireless devices, or stoves have been found very convenient to a housekeeper who may first, by gas or other fuel, heat the article to be cooked to the boiling point, and then place them in the fireless stove and then attend to other domestic duties without watching the cooking operation. This same convenience, but with better cooking, can be obtained by the present invention, which includes means in an oven or adjacent thereto for raising the temperature within the oven 212 degrees Fahrenheit, or approximately so in a short period of time and means for maintaining the high temperature for a longer period of time. This is accomplished by using a heating agent, as a large burner, to quickly produce a high temperature or initial heat and another heating agent, as a small gas burner, for maintaining the temperature for slow cooking. In utilizing gas as a fuel for this purpose, it was found necessary to provide ventilation in the oven to sustain combustion and by ventilating the oven better cooking results are obtained. For instance, when cooking articles in an air tight fireless stove, the articles, particularly pastry, tend to become soggy, heavy and devoid of those properties which characterize perfection in cooking. By providing my oven with a novel apertured damper, automatically controlled, the articles to be cooked are maintained during the cooking operation in the same condition as though prepared in an ordinary coal heated oven, consequently the articles may be cooked to perfection and yet permit of a housewife leaving the same for a reasonable period and upon return, find the food still cooking without danger of over-cooking.

Other features of my invention will appear as the construction is described, and reference will now be had to the drawings, wherein—

Fig. 2 is a horizontal sectional view of the oven, and

Fig. 3 is a front elevation of a portion of the same.

Figure 1:
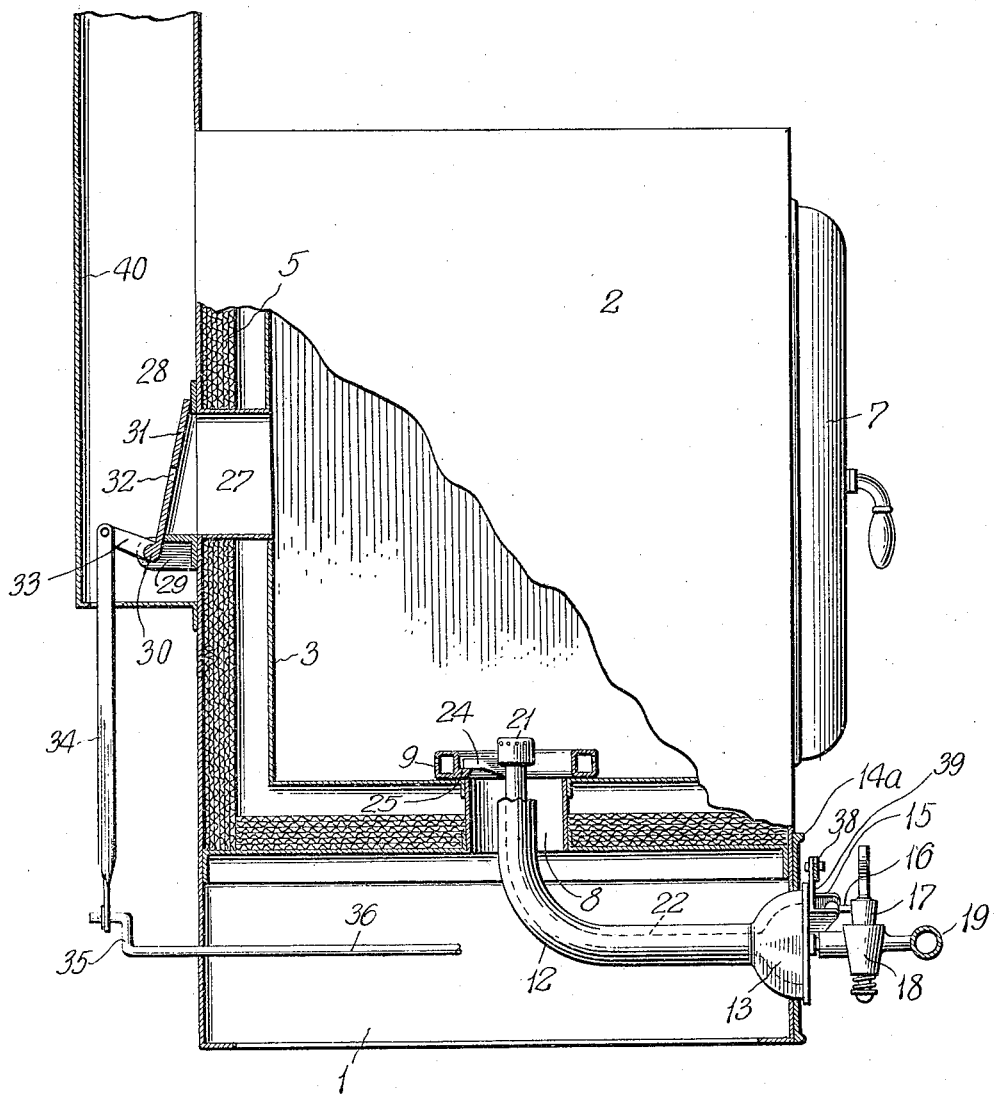
Figure 1 is a side elevation of the oven, partly broken away and partly in section, showing the burner and damper arrangement.

The oven comprises a suitable base 1, an outer shell 2 an inner shell 3, a doorway 4, insulation 5 against the inner side of the outer shell 2 and around the doorway 4, an air space 6 between the inner shell 3 and the insulation 5, and an insulated door 7 for the doorway 4. The detail construction of this oven structure and the advantages derived therefrom are clearly disclosed in the above mentioned Keep application, and reference will now be had to the alterations and additions which permit of the oven structure being used similarly to a fireless cooker.

In the first place, the bottom of the oven is provided with a central opening formed by a sleeve 8 extending through the bottom insulation and air space and connecting the inner and outer shells of the oven. Mounted over the opening is a circular gas burner 9 having positioning lugs 10 adapted to extend into the upper end of the sleeve 8 and properly position the burner relative to the opening. The side wall of the burner has an offset portion 11 for a goose-neck gas pipe that extends through the sleeve 8 to the front wall of the base 1 and terminates in a mixing device of the Pomaville type disclosed by the aforementioned patent. The mixing device is mounted in a face plate 14ª connected to the front wall of the base 1, and said mixing device includes a rotary shutter 13, and a channel member 15 carried thereby and adapted to be moved by an arm 16 on a plug 17 forming part of a gas valve 18 controlling the supply of gas to the mixing device and the burner 9. The gas valve 18 is in communication with the gas supply pipe 19 and this pipe has another gas valve 20 controlling the supply of gas to a small burner 21. The small burner 21 is located centrally of the large burner 9 and is carried by a curved and angularly disposed pipe 22 having a mixing device 23 at the face plate 14ª and in communication with the small valve 20. The small gas burner 21 is supported by a side projection 24 engaging on the seat 25 carried by the large gas burner 9, and to assist in properly positioning the pipe 22, the bottom wall of the oven has a depending channel guide 26.

Since gas is used as a fuel for heating the oven it is necessary to provide variable degrees of ventilation for the oven and this is accomplished by a novel damper actuated in synchronism with the large gas valve 18.

The rear wall of the oven has an opening formed by a sleeve 27 extending through the insulation 5, the air space 6 and connecting the inner and outer shells of the oven structure. At the outer end of the sleeve 27 there is a damper frame 28 providing apertured lugs 29 for the rock shaft or pintles 30 of a damper 31. The damper 31 is adapted to close the outer end of the frame 28 and the ventilating opening, but for a small port or ventilating opening 32 in the damper 31. The object of this small ventilating opening will presently appear.

The damper rock shaft 30 or one of the pintles of the damper has a crank 33 connected by a link 34 to the crank portion 35 of a valve rod 36 located within the base 1 of the oven. The rod 36 is suitably supported by the front and rear walls of the base 1 and extends through the face plate 14ª with the protruding end thereof provided with a crank 37 connected by a link 38 to a lever 39 forming part of the channel member 15 of the rotary shutter 13. The manner of articulating the damper 31 relative to the gas valve 18 permits of said damper and the valve plug 17 being simultaneously adjusted.

Inclosing the member 31 is a suitable casing 40 connected to the rear wall of the oven and this casing is adapted to communicate with a suitable flue or exhaust to the atmosphere.

Preparatory to cooking food in the oven, the gas at the large valve 18 is turned on and ignited at the large burner 9. The turning on of the gas at the large valve 18 causes the damper 31 to be opened and consequently there is sufficient ventilation to permit of the large burner 9 being used in the oven without any deleterious effect on the food to be cooked. After the large burner 9 is used for a short period of time to raise the temperature in the oven to an effective cooking point, then the gas at the small valve 20 is turned on, the gas at the small burner 21 ignited, and then the flame of the large burner 9 extinguished by closing the valve 18. This operation necessarily closes the damper 31, but the small port or opening 32 in the damper will afford sufficient ventilation for the operation of the small burner 21. This small burner will maintain the original oven temperature for a long period of time so that the food within the oven will be prepared or cooked similar to a fireless cooker. Figuratively speaking, the small port or ventilating opening 32 prevents moisture and condensation thus avoiding those conditions which cause the food to become soggy and of a heavy nature often necessitating further cooking when removed from a fireless cooker.

An initial expenditure of a few feet of gas in the beginning places my oven at a high temperature in a few minutes and then by confining this heat to a certain degree and maintaining it by an exceedingly small quantity of gas, food may be prepared similar to a fireless cooker or the oven may be used as usual in connection with a gas cooking range.

The insulation in connection with the oven performs the important office of retaining the initial heat produced by the large burner 9, otherwise, an oven or compartment devoid of insulation and air spaces would disseminate the heat by radiation and conduction.

The oven may be used as part of a cooking range having a broiler, grids or hot plates or may be used independent of a range or stove, and I do not care to confine my invention to the precise articulation of the damper and valve as shown; to the position of the burners or the sleeves 8 and 27, nor to any other changes that may fall within the scope of the appended claims.

What I claim is:—

1. An oven having inner and outer shells with insulation between said shells, said oven having a ventilating opening, an apertured damper therefor constantly establishing communication between the oven and the atmosphere, a small gas burner in said oven, a large gas burner in said oven, valves for said gas burners, mixing devices for said gas burners, and means actuated by the large burner valve adapted to adjust said damper.

2. An oven having inner and outer shells with insulation between said shells, said oven having a ventilating opening, an apertured damper therefor constantly establishing communication between the oven and the atmosphere, a small gas burner in said oven, a large gas burner in said oven, valves for said gas burner, mixing devices for said gas burners, and means in connection with the valve of the large burner to effect an adjustment of said damper when turning off and on said valve.

3. An oven having inner and outer shells with insulation between said shells, said oven having a ventilating opening, an apertured damper therefor, constantly establishing communication between the oven and the atmosphere, a small gas burner in said oven, a large gas burner in said oven, valves for said gas burners, mixing devices for said gas burners, and means actuated by the large burner valve adapted to adjust the mixing device thereof and said damper.

4. An oven having inner and outer shells with insulation between said shells, said oven having a ventilating opening, an apertured damper therefor constantly establishing communication between the oven and the atmosphere, a small gas burner in said oven, a large gas burner in said oven, valves for said gas burners, mixing devices for said gas burners, means articulating said damper and the mixing device of the large burner, and means articulating the mixing device and valve of the large burner so that said damper will be adjusted when turning off and on said valve.

In testimony whereof I affix my signature in the presence of two witnesses.

HENRY C. MAUL.

Witnesses:
CEPHRES POMAVILLE,
W. E. THOMPSON.

Copies of this patent may be obtained for five cents each, by addressing the "Commissioner of Patents, Washington, D. C."